3,367,970
PROCESS FOR PREPARING DIMETHYLAMINO-
ALKANES FROM NITROPARAFFINS
Robert W. Rosenthal, Pittsburgh, and Richard Seekircher, Gibsonia, Pa., assignors to Gulf Research & Development Company, Pittsburgh, Pa., a corporation of Delaware
No Drawing. Filed Nov. 23, 1964, Ser. No. 413,301
8 Claims. (Cl. 260—583)

ABSTRACT OF THE DISCLOSURE

A process for converting a nitroparaffin to the corresponding dimethylaminoalkane which involves reacting a nitroparaffin with formaldehyde and hydrogen in the presence of a hydrogenation catalyst.

This invention relates to a process for preparing tertiary amines.

The process defined herein involves subjecting a mononitroparaffin to reaction with formaldehyde and hydrogen in the presence of a hydrogenation catalyst. The mononitroparaffin employed herein can be obtained in any convenient or suitable manner but is preferably obtained in accordance with the procedure described and claimed in our copending application Ser. No. 413,280, filed concurrently herewith. Briefly, in said application a paraffin or mixture of paraffins normally liquid at atmospheric pressure and ambient temperature or liquid under the nitration conditions defined therein having from eight to 70 carbon atoms, preferably having from nine to 19 carbon atoms, are subjected to nitration with a nitrating agent, such as nitric acid or $NO_2$ at a temperature of about 100° to about 300° C. and a pressure of about 0 to about 50 pounds per square inch gauge. The mononitroparaffins obtained are recovered from the reaction mixture in any convenient manner, for example, the reaction mixture can be stirred at 25° C. with a 10 percent excess of a 15 weight percent aqueous solution of potassium hydroxide and the aqueous layer is then separated. Neutralization of the aqueous layer with $CO_2$ yields an insoluble layer of mononitroparaffins. Although the nitro (—$NO_2$) group in the mononitroparaffins so obtained or used herein will generally be attached to a secondary carbon atom on the paraffin chain, it is within the scope of this invention to employ mononitroparaffins wherein the nitro group is attached to a terminal carbon atom on the paraffin chain. Mononitroparaffins that can be employed include 1 - nitrooctane, 2 - nitrooctane, 3 - nitrooctane, 4 - nitrooctane, 2 - nitrododecane, 3 - nitrotridecane, 5 - nitropentadecane, 3 - nitroeicosane, 4 - nitroeicosane, 1 - nitroheptadecane, 2 - nitroheptadecane, 3 - nitrooctadecane, 4 - nitrooctadecane, 1 - nitroheptacontane, 2 - nitroheptancontane, 21 - nitroheptacontane, etc.

As pointed out above, the mononitroparaffin or mixture of mononitroparaffins are subjected to reaction with formaldehyde and hydrogen in the presence of a hydrogenation catalyst. The amount of formaldehyde required for the desired reaction will be at least about two mols per mol of said mononitroparaffins, preferably about two to about 2.5 mols per mol of said mononitroparaffins. The amount of hydrogen required will be at least about five mols per mol of said mononitroparaffins, although a large excess is preferred. The reaction can be carried out, for example, at a temperature of about 25° to about 200° C., preferably about 50° to about 150° C., and a pressure of about 100 to about 2,000 pounds per square inch gauge, preferably about 200 to about 700 pounds per square inch gauge. Reaction time can be, for example, from about five to about 120 minutes, preferably from about 15 to about 60 minutes. Any hydrogenation catalyst, such as, Raney nickel, Raney cobalt, platinum, supported or modified nickel catalysts, etc., can be employed. The amount of catalyst employed, based on the mononitroparaffin present, can be at least about one percent by weight, preferably from about two to about 20 percent by weight. The reaction is carried out in the presence of a solvent for the reactants and the reaction products. Examples of solvents that can be employed include methanol, ethanol, propanol, isopropanol, butanol, etc. Of these, we prefer to employ methanol and ethanol. The amount of solvent needed is that amount sufficient to solubilize the reactants and reaction product produced herein. This can be, for example, from about 1,000 to about 3,000 milliliters per mol of nitroparaffin.

At the end of the reaction the mononitroparaffins employed are converted to the corresponding dimethylaminoalkanes wherein the alkane portion thereof corresponds to the alkane portion of the mononitroparaffin employed. Examples of dimethylaminoalkanes produced herein include 1 - dimethylaminooctane, 2 - dimethylaminooctane, 3 - dimethylaminooctane, 4 - dimethylaminooctane, 2 - dimethylaminododecane, 3 - dimethylaminotridecane, 5 - dimethylaminopentadecane, 3 - dimethylaminoeicosane, 4 - dimethylaminooeicosane, 1 - dimethylaminoheptadecane, 2 - dimethylaminoheptadecane, 3 - dimethylaminooctadecane, 4 - dimethylaminooctadecane, 1 - dimethylaminoheptacontane, 2 - dimethylaminoheptacontane, 21 - dimethylaminoheptacontane, etc. These amines can be oxidized with hydrogen peroxide to the amine oxides which are biodegradable surface active agents having high foam stability.

The dimethylaminoalkanes produced herein are separated from the reaction product in any suitable manner. Thus, the product can be subjected to filtration to remove catalyst therefrom, and the remainder is then subjected to a temperature of about 60° to about 120° C. to flash off solvent therefrom. To the product left behind there is added water, for example, at least about two volumes per volume thereof, and a mineral acid, such as hydrochloric acid, in an amount stoichiometrically required to convert the amines to the corresponding amine salts. This can be done at a temperature of about 10° to about 30° C. and atmospheric pressure. The amine salts are soluble in the water, while the remaining materials are not soluble and will form a separate layer. The two layers are separated from each other in any convenient manner, for example, by decantation. To the clear aqueous layer containing the dissolved amine salt there is added at least the stoichiometric amount of a base, such as sodium hydroxide. This action releases the amine salt back to the corresponding amine which is insoluble in water and forms a separate layer. To recover the desired amine physical separation of the two layers, for example, decantation can be employed. Alternatively, the amine can be extracted with a suitable extractant, such as chloroform or ether. Distillation of the extractant from the extract leaves behind the desired amine.

The process defined herein is quite unexpected. Formaldehyde can react with either the nitrogen portion of the mononitroparaffin or with a carbon on the chain of said mononitroparaffin. The latter would be expected when said carbon is attached directly to the nitrogen on the nitro portion thereof and when there is a hydrogen also attached to said carbon. Since the mononitroparaffins employed herein have a carbon attached to both a hydrogen and a nitro group, it would have been expected that substantial reaction with said carbon would occur to form hydroxymethylnitroparaffins. Unexpectedly, we have found no evidence of such reaction and that dimethylaminoalkanes instead are formed. We have also found that to produce tertiary amines in accordance with the procedure defined herein it is critical that formaldehyde be employed in the reaction. The use of acetaldehyde, for example, in place of formaldehyde resulted in the production of N-ethylaminoparaffins with only a small amount of N,N-diethylaminoparaffins.

The process of this invention can further be illustrated by the following:

EXAMPLE I

To 10.8 grams (0.05 mol) of a mixture of 1-, 2-, 3-, 4-, 5- and 6-nitrododecanes, there were added 10 grams (0.12 mol) of 37 percent aqueous formaldehyde, 10 grams of nickel (Girdler Nickel Catalyst 49B) and 100 milliliters of methanol and the resultant slurry was stirred in a 300 milliliter autoclave at a temperature in the range of 40° to 90° C. and a hydrogen pressure of 500 pounds per square inch gauge for one hour. At the end of this period there was no longer absorption of hydrogen. The contents of the reactor were cooled to room temperature, the pressure released and the catalyst removed therefrom by filtration. The methanol was stripped from the reaction mixture by heating at a temperature of 64° C. at atmospheric pressure and the residue was treated with 100 milliliters of water containing 1.8 grams (0.05 mol) of hydrochloric acid. The aqueous solution was extracted with 100 milliliters of ether and the amine sprung with two grams (0.05 mol) of sodium hydroxide. Distillation yieded nine grams (84 percent yield) of dimethylaminododecanes distilling at a temperature of 90°-95° C. at one millimeter of mercury.

EXAMPLE II

Utilizing the procedure described in Example I, mixtures of 1-, 2-, 3-, 4-, 5-, 6- and 7- nitrotridecanes; 1-, 2-, 3-, 4-, 5-, 6- and 7-nitrotetradecanes and 1-, 2-, 3-, 4-, 5-, 6-, 7- and 8-nitropentadecanes were converted into the corresponding mixtures of dimethylaminoparaffins. The results are given in the following table:

| Carbon Number | Nitroparaffin (mol) | 37% Formaldehyde (mol) | Girdler Nickel Catalyst 49B (grams) | Methanol (milliliters) | Temperature, °C. | H₂, p.s.i.g. | Yield Dimethylaminoparaffin (percent) |
|---|---|---|---|---|---|---|---|
| 13 | 0.4 | 1.0 | 40 | 900 | 25-78 | 400-700 | 60 |
| 14 | 0.3 | 0.6 | 30 | 600 | 21-64 | 420-695 | 62 |
| 15 | 0.3 | 0.6 | 30 | 700 | 24-70 | 300-560 | 78 |

EXAMPLE III

To 86 grams (0.4 mol) of a mixture of 1-, 2-, 3-, 4-, 5- and 6-nitrododecanes there were added 24 grams (0.8 mol) of paraformaldehyde, 40 grams of catalyst (Girdler Nickel 49B), and 800 milliliters of methanol and the resultant slurry was stirred in a two-liter autoclave at a temperature range of 25° to 70° C. and a hydrogen pressure of 760 pounds per square inch gauge for one hour. At the end of this period there was no longer absorption of hydrogen. Analysis of the reaction mixture by gas-liquid chromatography indicated that an 81 percent yield of dimethylaminododecanes had been obtained.

That formaldehyde must be employed herein is apparent from the following, wherein acetaldehyde was substituted therefore in a reaction with a mixture of 1-, 2-, 3-, 4-, 5-, 6- and 7-nitrotridecanes and a mixture of N-ethylaminotridecanes was obtained.

EXAMPLE IV

To 69 grams (0.3 mol) of a mixture of 1-, 2-, 3-, 4-, 5-, 6- and 7-nitrotridecanes there were added 26.4 grams (0.06 mol) of acetaldehyde, 30 grams of catalyst (Girdler Nickel 49A), and 600 milliliters of 95 percent ethanol and the resultant slurry was stirred in a two-liter autoclave at 23°-56° C. under 300-680 pounds per square inch gauge of hydrogen for 140 minutes. Isolation of the products by acid extraction yielded 15 grams of a neutral product and 51 grams of a crude basic fraction. Distillation of the basic fraction yielded 42 grams of material distilling at 90°-95° C. (0.5 millimeter of mercury) and having a molecular weight of 211 by acid titraiton. This titration checked with gas-liquid chromatography analysis which indicated the material was 71 percent aminotridecanes, 28 percent N-ethylaminotridecanes and a trace of N,N-diethylaminotridecanes.

Obviously, many modifications and variations of the invention as hereinabove set forth, can be made without departing from the spirit and scope thereof, and therefore only such limitations should be made as are indicated in the appended claims.

We claim:
1. A process for converting a nitroparaffin to the corresponding dimethylaminoalkane which comprises reacting a nitroparaffin with formaldehyde and hydrogen in the presence of a hydrogenation catalyst.

2. A process for converting a nitroparaffin to the corresponding dimethylaminoalkane which comprises reacting a nitroparaffin having from eight to 70 carbon atoms with formaldehyde and hydrogen in the presence of a hydrogenation catalyst.

3. A process for converting a nitroparaffin to the corresponding dimethylaminoalkane which comprises reacting a nitroparaffin having from eight to 70 carbon atoms with formaldehyde and hydrogen in the presence of a hydrogenation catalyst at a temperature of about 25° to about 200° C.

4. A process for converting a nitroparaffin to the corresponding dimethylaminoalkane which comprises reacting a nitroparaffin having from eight to 70 carbon atoms with at least about two mols of formaldehyde and five mols of hydrogen in the presence of nickel at a temperature of about 25° to about 200° C.

5. A process for converting a nitroparaffin to the corresponding dimethylaminoalkane which comprises reacting a nitrododecane with formaldehyde and hydrogen in the presence of nickel at a temperature of about 25° to about 200° C. at a pressure of about 100 to about 2000 pounds per square inch gauge to form dimethylaminododecane.

6. A process for converting a nitroparaffin to the corresponding dimethylaminoalkane which comprises reacting a nitrododecane with formaldehyde and hydrogen in the presence of nickel at a temperature of about 25° to about 200° C. at a pressure of about 100 to about 2000 pounds per square inch gauge to form dimethylaminotridecane.

7. A process for converting a nitroparaffin to the corresponding dimethylaminoalkane which comprises reacting a nitrotetradecane with formaldehyde and hydrogen in the presence of nickel at a temperature of about 25° to about 200° C. at a pressure of about 100 to about 2000 pounds per square inch gauge to form dimethylaminotetradecane.

8. A process for converting a nitroparaffin to the corresponding dimethylaminoalkane which comprises reacting a nitropentadecane with formaldehyde and hydrogen in the presence of nickel at a temperature of about 25° to about 200° C. at a pressure of about 100 to about 2000 pounds per square inch gauge to form dimethylaminopentadecane.

References Cited

UNITED STATES PATENTS

| | | | |
|---|---|---|---|
| 2,380,420 | 7/1945 | Emerson | 260—583 X |
| 2,388,608 | 11/1945 | Emerson | 260—583 X |
| 2,414,031 | 1/1947 | Emerson | 260—583 |

FLOYD D. HIGEL, *Primary Examiner.*

UNITED STATES PATENT OFFICE

CERTIFICATE OF CORRECTION

Patent No. 3,367,970            February 6, 1968

Robert W. Rosenthal et al.

It is hereby certified that error appears in the above numbered patent requiring correction and that the said Letters Patent should read as corrected below.

Column 4, line 1, for "(0.06 mol)" read -- (0.6 mol) --; line 63, for "nitrododecane" read -- nitrotridecane --.

Signed and sealed this 20th day of May 1969.

EAL)

test:

ward M. Fletcher, Jr.

testing Officer                      Commissioner of Patents